(12) United States Patent
Tong et al.

(10) Patent No.: US 9,781,666 B2
(45) Date of Patent: Oct. 3, 2017

(54) COMMUNICATION CONTROL METHOD, BASE STATION AND USER TERMINAL (71) Applicant: KYOCERA CORPORATION, Kyoto (JP)

(72) Inventors: Fangwei Tong, Machida (JP); Kugo Morita, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 20 days.

(21) Appl. No.: 14/761,894

(22) PCT Filed: Jan. 14, 2014

(86) PCT No.: PCT/JP2014/050439
§ 371 (c)(1),
(2) Date: Jul. 17, 2015

(87) PCT Pub. No.: WO2014/112468
PCT Pub. Date: Jul. 24, 2014

(65) Prior Publication Data
US 2015/0365887 A1 Dec. 17, 2015

Related U.S. Application Data (60) Provisional application No. 61/754,093, filed on Jan. 18, 2013.

(51) Int. Cl.
H04W 48/18 (2009.01)
H04W 4/02 (2009.01)
H04W 76/02 (2009.01)

(52) U.S. Cl.
CPC ............. *H04W 48/18* (2013.01); *H04W 4/02* (2013.01); *H04W 76/023* (2013.01)

(58) Field of Classification Search
None
See application file for complete search history.

(56) References Cited

U.S. PATENT DOCUMENTS 7,454,215 B2    11/2008  Hamano et al.
8,635,335 B2 *   1/2014  Raleigh ............... H04W 36/245
                                                         455/456.3
(Continued)

FOREIGN PATENT DOCUMENTS

CN      102421166       4/2012
JP      2009-088684 A   4/2009
(Continued)

OTHER PUBLICATIONS

International Search Report, PCT/JP2014/050439, Mar. 11, 2014.
(Continued)

*Primary Examiner* — Min Jung
(74) *Attorney, Agent, or Firm* — Studebaker & Brackett PC (57) ABSTRACT A communication control method for linking a cellular communication system with a wireless LAN system comprises: in a cellular base station, a step of storing location information of a wireless LAN access point; a step of acquiring location information of a user terminal connected to the cellular base station; a step of determining, on the basis of the respective location information of the wireless LAN access point and the user terminal, whether or not the user terminal is connected to the wireless LAN access point; and a step of transmitting a scan instruction for the wireless LAN access point to the user terminal when it is determined that the user terminal is connected to the wireless LAN access point.

3 Claims, 8 Drawing Sheets

(56) References Cited

U.S. PATENT DOCUMENTS

| | | | |
|---|---|---|---|
| 9,445,353 B2* | 9/2016 | Ullah | H04W 48/16 |
| 9,578,674 B2* | 2/2017 | Visuri | H04W 76/046 |
| 2010/0151858 A1* | 6/2010 | Brisebois | H04W 24/10 |
| | | | 455/434 |
| 2011/0222523 A1* | 9/2011 | Fu | H04W 36/22 |
| | | | 370/338 |
| 2013/0163463 A1* | 6/2013 | Grayson | H04L 43/0876 |
| | | | 370/253 |
| 2013/0225164 A1* | 8/2013 | Buckley | H04W 48/18 |
| | | | 455/433 |
| 2013/0242965 A1* | 9/2013 | Horn | H04W 24/10 |
| | | | 370/338 |
| 2014/0092742 A1* | 4/2014 | Chou | H04W 52/0258 |
| | | | 370/235 |
| 2014/0141779 A1 | 5/2014 | Yuk et al. | |
| 2014/0256317 A1 | 9/2014 | Zhao et al. | |
| 2014/0287751 A1* | 9/2014 | Lee | H04W 48/16 |
| | | | 455/434 |
| 2014/0341038 A1* | 11/2014 | Lim | H04W 28/08 |
| | | | 370/235 |
| 2015/0181565 A1* | 6/2015 | Sirotkin | H04W 12/02 |
| | | | 370/329 |
| 2015/0365861 A1* | 12/2015 | Sharony | H04W 36/14 |
| | | | 455/438 |

FOREIGN PATENT DOCUMENTS

| | | |
|---|---|---|
| WO | 2004/023741 A1 | 3/2004 |
| WO | 2011/110108 A1 | 9/2011 |
| WO | 2011/146831 A1 | 11/2011 |
| WO | 2013/009111 A2 | 1/2013 |

OTHER PUBLICATIONS

Written Opinion of the International Searching Authority, PCT/JP2014/050439, Mar. 11, 2014.

3rd Generation Partnership Project; 3GPP™ Work Item Description, 3GPP TSG-RAN Meeting#57, Chicago, USA, Sep. 13-15, 2012.

The European search report (under R.61 or R.63 EPC) or the supplementary european search report (Art. 153 (7) EPC) issued by the European Patent Office on Sep. 23, 2016, which corresponds to European Patent Application No. 14740996.5-1854 and is related to U.S. Appl. No. 14/761,894.

An Office Action issued by the Japanese Patent Office on Mar. 7, 2017, which corresponds to Japanese Patent Application No. 2014-5574565 and is related to U.S. Appl. No. 14/761,894; with Concise Statement of Relevance; 4pp.

\* cited by examiner

AP REGISTRATION INFORMATION TABLE

| AP | AP INFORMATION |
|---|---|
| AP1 | SSID/ESSID, LONGITUDE, LATITUDE, ... |
| AP2 | SSID/ESSID, LONGITUDE, LATITUDE, ... |
| ... | ... |

FIG. 9

PAIRING TABLE

| UEs<br>LOW RANK⇔HIGH RANK | ACCESS POINTs<br>(HIGH RANK⇔LOW RANK) |
|---|---|
| ...UE3,UE2,UE1 | AP1,AP2,AP3... |
| ...UE6,UE5,UE4 | AP4,AP5, ... |
| ... | ... |

FIG. 10

WLAN NON-SUPPORT UE TABLE

| |
|---|
| UE10 |
| UE11 |
| UE12 |
| ... |

FIG. 11

CONNECTION FAILURE UE TABLE

| |
|---|
| UE7 |
| UE8 |
| UE9 |
| ... |

FIG. 12

US 9,781,666 B2

COMMUNICATION CONTROL METHOD, BASE STATION AND USER TERMINAL

TECHNICAL FIELD

A present invention relates to a communication control method for linking a cellular communication system with a wireless LAN system, a cellular base station thereof, and a user terminal thereof.

BACKGROUND ART

In recent years, a user terminal (so-called dual terminal) including a cellular communication unit and a wireless LAN communication unit is becoming widely used. Further, the number of wireless LAN access points operated by an operator of a cellular communication system increases.

Therefore, in 3GPP (3rd Generation Partnership Project) which is a project aiming to standardize a cellular communication system, consideration is given to introduction of a technology capable of strengthening linkage between a cellular communication system and a wireless LAN system (see Non Patent Document 1).

PRIOR ART DOCUMENT

Non-Patent Document

Non-Patent Document 1: 3GPP contribution "RP-1201455"

SUMMARY OF THE INVENTION

Further, when a user terminal effectively utilizes a wireless LAN access point, it may be possible to disperse a load at a cellular base station to the wireless LAN access points.

Therefore, the present invention provides a communication control method in which a user terminal effectively utilizes a wireless LAN access point, a cellular base station thereof, and a user terminal thereof.

A communication control method according to an embodiment is a method for linking a cellular communication system with a wireless LAN system. The communication control method comprises: in a cellular base station, a step of storing location information of a wireless LAN access point; a step of acquiring location information of a user terminal connected to the cellular base station; a step of determining, on the basis of the respective location information of the wireless LAN access point and the user terminal, whether or not the user terminal is connected to the wireless LAN access point; and a step of transmitting a scan instruction for the wireless LAN access point to the user terminal when it is determined that the user terminal is connected to the wireless LAN access point.

DESCRIPTION OF THE EMBODIMENT

[Overview of Embodiment]

A communication control method according to an embodiment is a method for linking a cellular communication system with a wireless LAN system. The communication control method comprises: in a cellular base station, a step of storing location information of a wireless LAN access point; a step of acquiring location information of a user terminal connected to the cellular base station; a step of determining, on the basis of the respective location information of the wireless LAN access point and the user terminal, whether or not the user terminal is connected to the wireless LAN access point; and a step of transmitting a scan instruction for the wireless LAN access point to the user terminal when it is determined that the user terminal is connected to the wireless LAN access point.

In an embodiment, the communication control method, further comprises: in the user terminal, a step of scanning the wireless LAN access point in response to reception of the scan instruction from the cellular base station; a step of reporting a result of the scan to the cellular base station; and a step of connecting to the wireless LAN access point when the wireless LAN access point is discovered by the scan.

In an embodiment, in the step of determining, the cellular base station determines, on the basis further of at least one of an amount and a category of traffic transmitted and received by the user terminal, whether or not the user terminal is connected to the wireless LAN access point is determined.

In an embodiment, the communication control method further comprises: a step of inquiring the user terminal, from cellular base station, of whether or not a wireless LAN is supported.

In an embodiment, the scan instruction includes an identifier for identifying the wireless LAN access point.

In an embodiment, the communication control method further comprises: a step of inquiring the user terminal, from the cellular base station, of whether there is connection setting information used for secret communication with the wireless LAN access point.

In an embodiment, the communication control method, further comprises: a step of requesting issuance of temporary connection setting information from the cellular base station to the wireless LAN access point, when the user terminal does not have the connection setting information; and a step of notifying the user terminal from the wireless LAN access point by way of the cellular base station, of the temporary connection setting information issued by the wireless LAN access point in response to the request.

In an embodiment, the communication control method further comprises: a step of inquiring a service management server from the cellular base station, of whether or not the user terminal is registered in a service capable of using the wireless LAN access point.

In an embodiment, the communication control method further comprises: a step of transmitting authentication information for registering the service from the cellular base station to the user terminal when the user terminal is not registered in the service.

A cellular base station according to the embodiment comprises: a storage unit configured to store location information of a wireless LAN access point; and a control unit configured to acquire location information of a user terminal connected to the cellular base station. The control unit transmits a scan instruction for the wireless LAN access point to the user terminal when it is determined, on the basis of the respective location information of the wireless LAN access point and the user terminal, to connect the user terminal to the wireless LAN access point.

A user terminal according to the embodiment is a user terminal connected to a cellular base station, and comprises: a control unit configured to scan the wireless LAN access point response to reception of a scan instruction for the wireless LAN access point from the cellular base station. The control unit reports a result of the scan to the cellular base station. The control unit connects to the wireless LAN access point when the wireless LAN access point is discovered by the scan.

[Embodiment]

Below, with reference to the drawing, an embodiment in which an LTE system being a cellular communication system configured in compliance with the 3GPP standards is linked with a wireless LAN (WLAN) system will be described.

(System Configuration)

Figure 1:
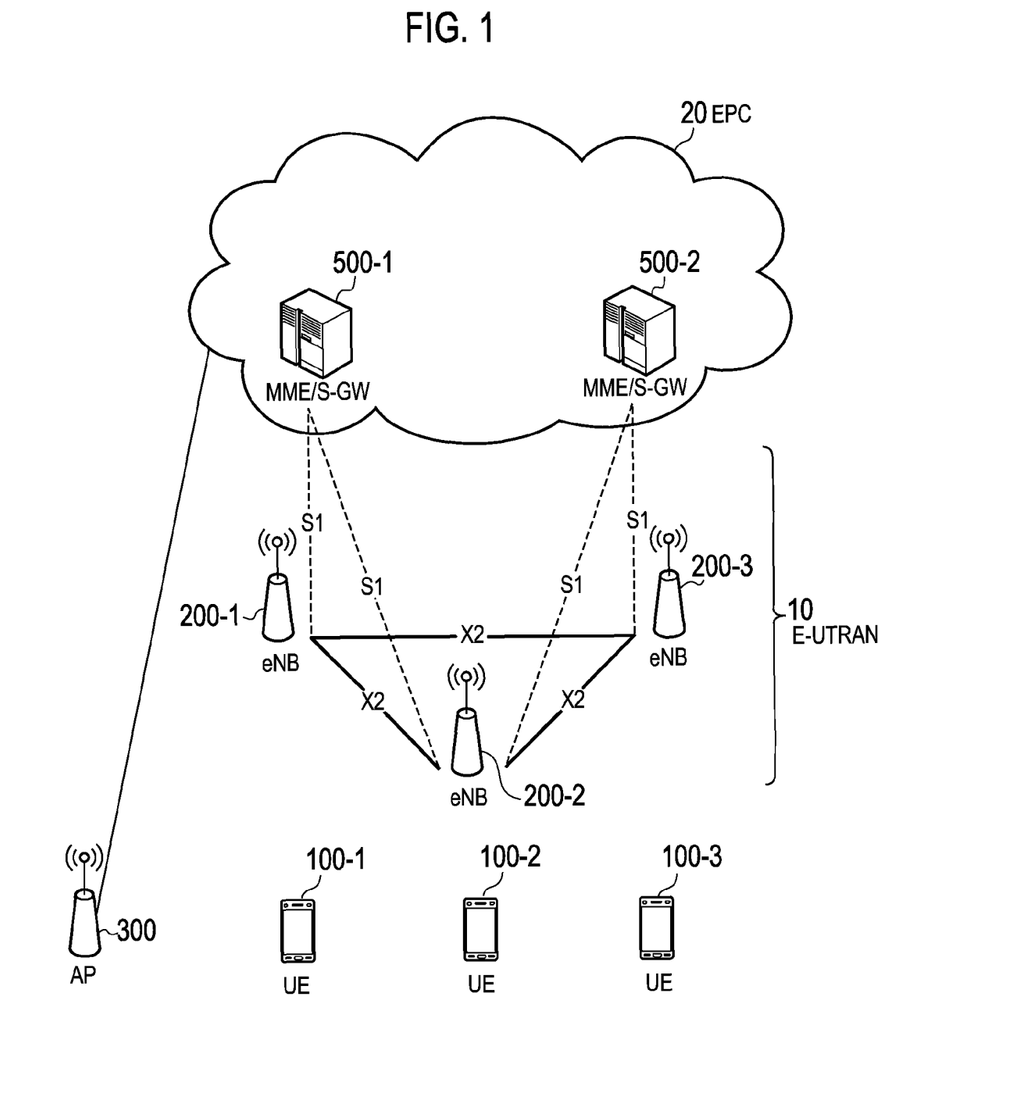
FIG. 1 is a system configuration diagram according to an embodiment.

FIG. 1 is a system configuration diagram according to the present embodiment. As shown in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network. The EPC 20 corresponds to a core network.

The UE 100 is a mobile radio communication device and performs radio communication with a cell with which a connection is established. The UE 100 corresponds to the user terminal. The UE 100 is a terminal (dual terminal) that supports both cellular communication scheme and WLAN communication scheme.

The E-UTRAN 10 includes a plurality of eNBs 200 (evolved Node-Bs). The eNB 200 corresponds to a base station. The eNB 200 manages one or a plurality of cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MMES (Mobility Management Entities)/S-GWs (Serving-Gateways) 500. The MME is a network node for performing various mobility controls, for example, for the UE 100, and corresponds to a controller. The S-GW is a network node that performs transfer control of user data and corresponds to a mobile switching center.

The WLAN system includes WLAN AP (hereinafter, "AP") 300. The WLAN system is configured to be in compliance with some IEEE 802.11 standards, for example. The AP 300 communicates with the UE 100 in a frequency band (WLAN frequency band) different from a cellular frequency band. The AP 300 is connected to the EPC 20 via a router, etc. In the present embodiment, the AP 300 is operated by an operator of the cellular communication system (the LTE system).

Subsequently, a configuration of the UE 100, the eNB 200, and the AP 300 will be described.

Figure 2:
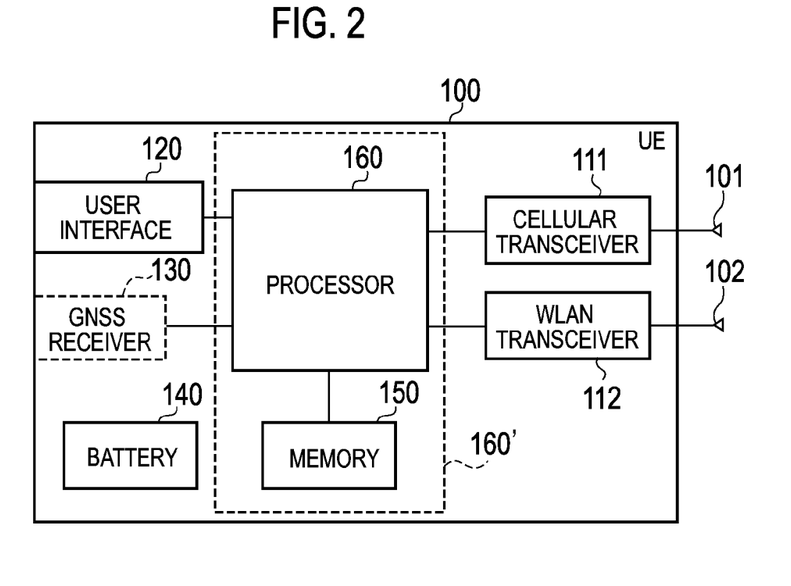
FIG. 2 is a block diagram of UE (user terminal) according to the embodiment.

FIG. 2 is a block diagram of the UE 100. As shown in FIG. 2, the UE 100 includes: antennas 101 and 102; a cellular transceiver (cellular communication unit) 111; a WLAN transceiver (WLAN communication unit) 112; a user interface 120; a GNSS (Global Navigation Satellite System) receiver 130; a battery 140; a memory 150; and a processor 160. The memory 150 and the processor 160 configure a control unit. The UE 100 may not have the GNSS receiver 130. It is noted that the memory 150 may be integrally formed with the processor 160, and this set (that is, a chipset) may be called a processor 160'.

The antenna 101 and the cellular transceiver 111 are used for transmitting and receiving a cellular radio signal. The cellular transceiver 111 converts a baseband signal output from the processor 160 into the cellular radio signal, and transmits the same from the antenna 101. Further, the cellular transceiver 111 converts the cellular radio signal received by the antenna 101 into the baseband signal, and outputs the same to the processor 160.

The antenna 102 and the WLAN transceiver 112 are used for transmitting and receiving a WLAN radio signal. The WLAN transceiver 112 converts the baseband signal output from the processor 160 into a WLAN radio signal, and transmits the same from the antenna 102. Further, the WLAN transceiver 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
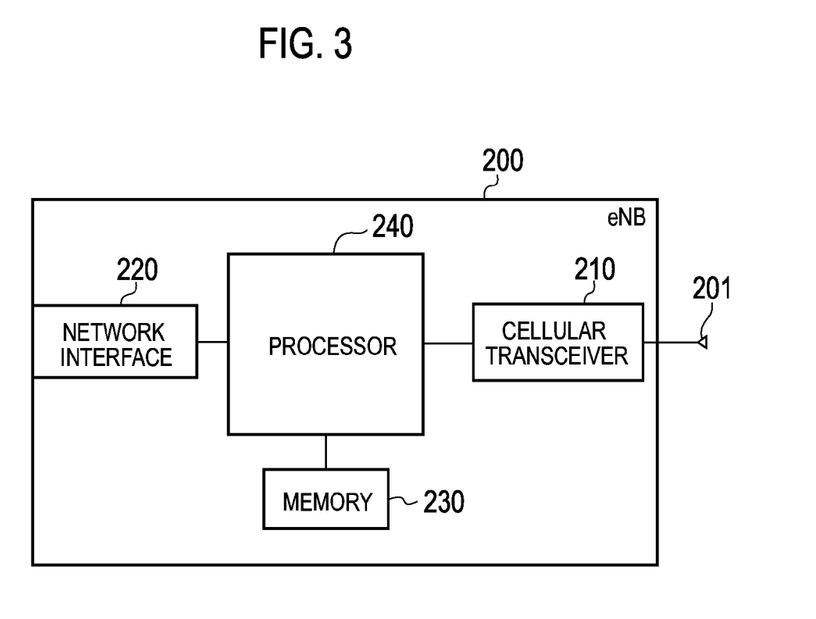
FIG. 3 is a block diagram of eNB (cellular base station) according to the embodiment.

FIG. 3 is a block diagram of the eNB 200. As shown in FIG. 3, the eNB 200 includes an antenna 201, a cellular transceiver 210, a network interface 220, a memory 230, and a processor 240. The memory 230 and the processor 240 configure a control unit. It is noted that the memory 230 may be integrally formed with the processor 240, and this set (that is, a chipset) may be called a processor.

The antenna 201 and the cellular transceiver 210 are used for transmitting and receiving a cellular radio signal. The cellular transceiver 210 converts the baseband signal output from the processor 240 into the cellular radio signal, and transmits the same from the antenna 201. Furthermore, the cellular transceiver 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface. The network interface 220 may be used for communication with the AP 300 via the EPC 20.

The memory 230 stores a program to be executed by the processor 240 and information (such as various tables described later) to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
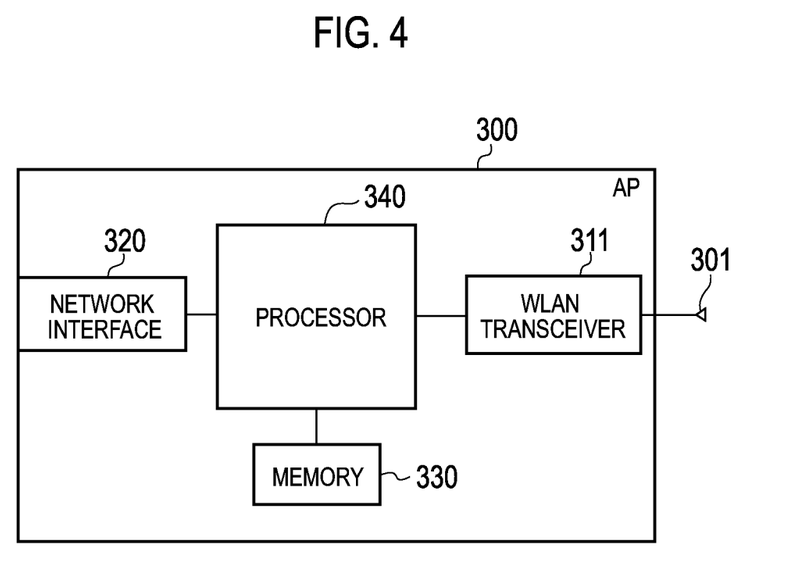
FIG. 4 is a block diagram of AP (wireless LAN access point) according to the embodiment.

FIG. 4 is a block diagram of the AP 300. As shown in FIG. 4, the AP 300 includes an antenna 301, a WLAN transceiver 311, a network interface 320, a memory 330, and a processor 340. It is noted that the memory 330 may be integrally formed with the processor 340, and this set (that is, a chipset) may be called a processor.

The antenna 301 and the WLAN transceiver 311 are used for transmitting and receiving the WLAN radio signal. The WLAN transceiver 311 converts the baseband signal output from the processor 340 into the WLAN radio signal and transmits the same from the antenna 301. Further, the WLAN transceiver 311 converts the WLAN radio signal received by the antenna 301 into the baseband signal and outputs the same to the processor 340.

The network interface 320 is connected to the EPC 20 via a router, etc. The network interface 320 may be used for communication with the eNB 200 via the EPC 20.

The memory 330 stores a program executed by the processor 340 and information used for a process by the processor 340. The processor 340 includes the baseband processor that performs modulation and demodulation, and encoding and decoding on the baseband signal and a CPU that performs various processes by executing the program stored in the memory 330.

Figure 5:
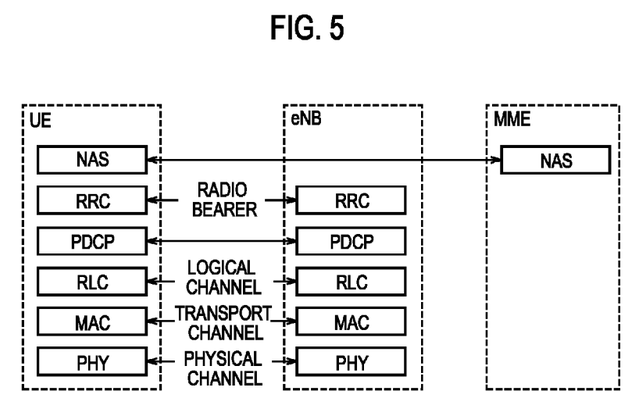
FIG. 5 is a protocol stack diagram of a radio interface in an LTE system.

FIG. 5 is a protocol stack diagram of a radio interface in the LTE system. As shown in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs priority control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme and the like) of an uplink and a downlink, and an allocated resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected state), otherwise, the UE 100 is in an idle state (RRC idle state).

A NAS (Non-Access Stratum) layer positioned above the RRC layer performs session management or mobility management, for example.

Figure 6:
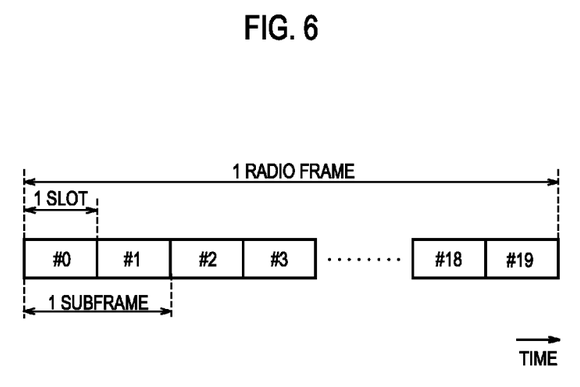
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As shown in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. The resource block includes a plurality of subcarriers in the frequency direction.

Among radio resources allocated to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region that can be mainly used as a physical downlink shared channel (PDSCH). Furthermore, in the downlink, reference signals such as cell-specific reference signals are distributed and arranged in each subframe.

In the uplink, both ends, in the frequency direction, of each subframe are control regions mainly used as a physical uplink control channel (PUCCH). Furthermore, the center portion, in the frequency direction, of each subframe is a region that can be mainly used as a physical uplink shared channel (PUSCH).

(Operation According to Embodiment)

Figure 7:
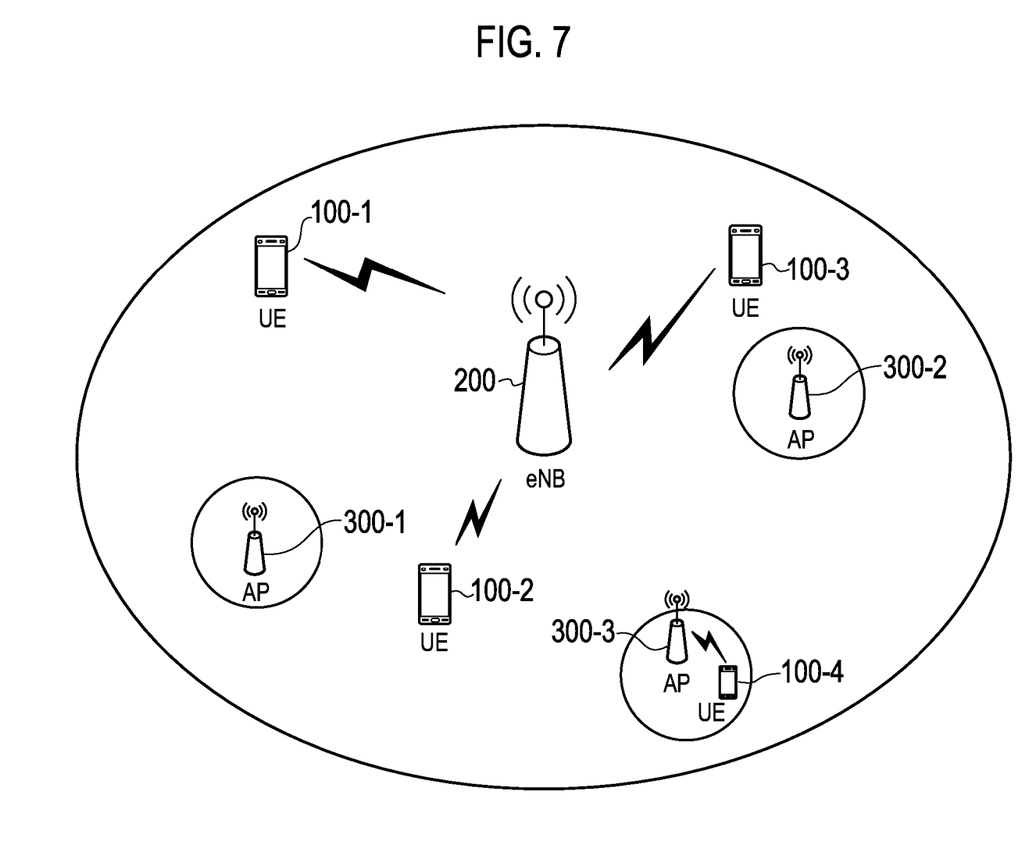
FIG. 7 is a diagram for illustrating an operation environment according to the embodiment.

Next, an operation according to the present embodiment will be described. FIG. 7 is a diagram for explaining an operation environment according to the present embodiment.

As shown in FIG. 7, the AP(s) 300 (AP 300-1 to AP 300-3) is arranged within a coverage of the eNB 200. In the present embodiment, the eNB 200 is a macro bases station that manages a cell (macro cell) over a wide range. UE 100-1 to UE 100-3 are connected to a cell of the eNB 200, and perform cellular communication with the eNB 200. When the eNB 200 accommodates a large number of UEs 100, a load of the eNB 200 increases. That is, an amount of a radio resource (a resource block, etc.) that can be allocated by the eNB 200 to each UE 100 decreases.

The AP 300 is operated by an operator of a cellular communication system (in the present embodiment, the LTE system). UE 100-4 is connected to the AP 300-3, and performs WLAN communication with the AP 300-3. On the other hand, there is no UE 100 to be connected to the AP 300-1 and the AP 300-2.

Hereinafter, an operation of the eNB 200 for dispersing (offloading) the load of the eNB 200 to the AP 300 will be described.

Figure 8:
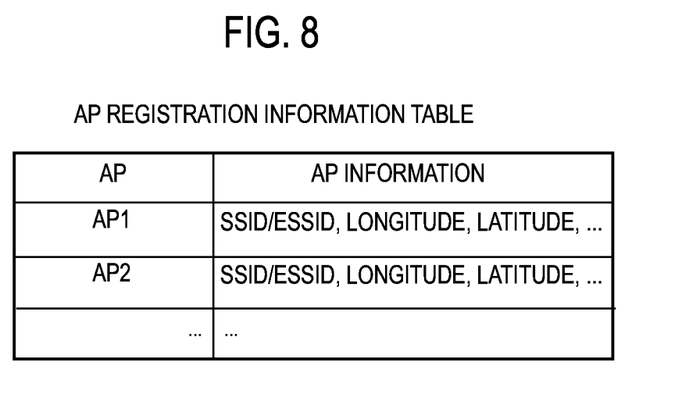
FIG. 8 is a diagram showing a specific example of an AP registration information table according to the embodiment.

Firstly, the eNB 200 stores the location information (specifically, AP registration information table including the location information) of each AP 300 arranged in the cell of the eNB 200. FIG. 8 is a diagram showing a specific example of the AP registration information table. As shown in FIG. 8, the AP registration information table includes an identifier (SSID/ESSID) and location information (longitude, latitude, etc.) of each AP 300 arranged within the cell of the eNB 200.

The AP registration information table is created and updated by an operator, for example. When the eNB 200 is capable of communicating with the AP 300, the eNB 200 may acquire the information of the AP 300 to update the AP registration information table. For example, the eNB 200 may update the AP registration information table on the basis of information on connection availability (power on/off, etc.) of the AP 300.

Alternatively, the eNB 200 may update the AP registration information table on the basis of a report of whether the scan is successful or not (whether the connection is successful or not), described later. The eNB 200 monitors and records a status of the connection availability, and deletes the AP 300 that has no successful connection record from the AP registration information table. Then, the eNB 200 again monitors the status of the successful connection about the deleted AP 300 with a constant interval (half day, one day, etc.), and when the connection is successful, the eNB 200 adds again the AP 300 to the AP registration information table.

Secondly, the eNB 200 acquires the location information (longitude, latitude, etc.) of each UE 100 connected to the cell of the eNB 200. For example, the eNB 200 may acquire the location information by the GNSS from the UE 100, and may acquire UE location information from a location information management server (E-SMLC: Evolved Serving Mobile Location Centre) arranged in the EPC 20. Alternatively, the eNB 200 may acquire the UE location information from UE direction information based on antenna directivity control and UE distance information based on transmission power control or transmission timing control.

Thirdly, the eNB 200 associates (pairs) the AP 300 with the UE 100 adjacent thereto, on the basis of the location information of each of the UE 100 and the AP 300. For example, the eNB 200 calculates a distance between the UE 100 and the AP 300, and performs pairing when the distance is within a distance that corresponds to a maximum communication range of the WLAN.

In the present embodiment, the eNB 200 ranks the distance to the AP 300 for each UE 100 in proximity to the AP 300, and sets a priority for connecting to the AP 300. Specifically, the eNB 200 sets a higher priority to the UE 100 nearer the AP 300.

For the use for the ranking, the eNB 200 may further acquire an amount and/or a category of traffic transmitted and received by each UE 100 connected to the cell of the eNB 200. The amount of traffic may be an amount of actual traffic per unit time, or may be an amount of traffic to be estimated from an amount of allocated radio resource. It is possible to determine the category of traffic from QoS corresponding to a bearer of the UE 100, for example. The eNB 200 sets a higher priority to the UE 100 having a larger amount of traffic. Further, the eNB 200 sets a higher priority to the UE 100 that transmits and receives a traffic having a lower QoS.

Figure 9:
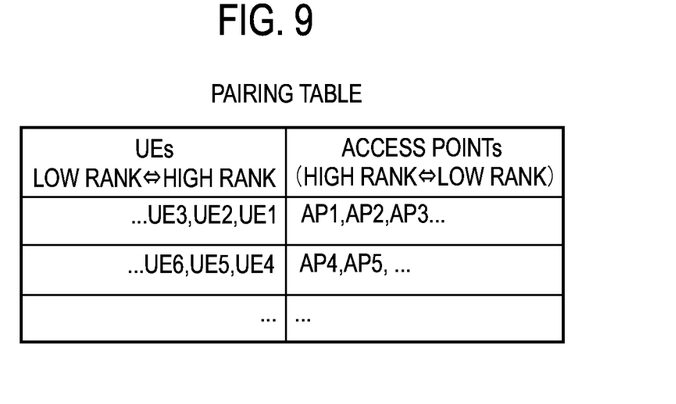
FIG. 9 is a diagram showing a specific example of a pairing table according to the embodiment.

The eNB 200 stores and updates the pairing table in accordance with the result of the pairing and the set priority (ranking). FIG. 9 is a diagram showing a specific example of the pairing table. As shown in FIG. 9, in the pairing table, the above-described result of the pairing and priority (ranking) are recorded. In FIG. 9, the priority (ranking) is set also to the AP 300, and the priority is set in accordance with a distance to the UE 100 having the highest priority or a distance to an average location of each corresponding UE 100, for example.

The eNB 200 regularly updates the pairing table. In this case, when it is assumed that a UE moving speed is mainly at 5 to 7 km/h or slower, a movement of about 20 m in 10 seconds is achieved, and when it is supposed that a maximum communication range of WLAN is about 50 m, it would be appropriate to update with an interval of 1 to 10 seconds.

Fourthly, the eNB 200 determines, on the basis of the pairing table, whether or not the UE 100 is connected to the paired AP 300. In the present embodiment, the eNB 200 determines that the UE 100 having a high priority is connected to the paired AP 300. The eNB 200 may regularly make such a determination, and may make such a determination when a load level of the eNB 200 exceeds a threshold value.

Figure 10:
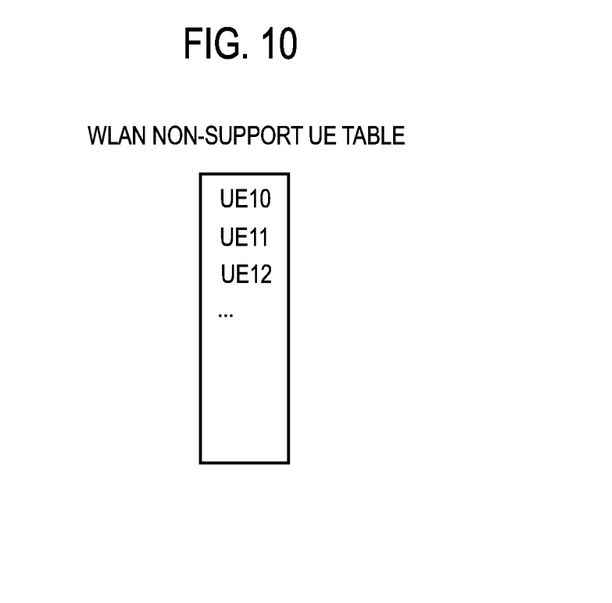
FIG. 10 is a diagram showing a specific example of a WLAN non-support UE table according to the embodiment.

It is noted that there may exist UE 100 that does not support WLAN in a plurality of UEs 100 connected to the cell of the eNB 200. Therefore, the eNB 200 may inquire the UE 100 of whether the WLAN is supported and store a result of the inquiry. A specific example of a table where UE that does not support WLAN (WLAN non-support UE) is recorded is shown in FIG. 10. The eNB 200 exclude the WLAN non-support UE from connection target to the AP 300 (that is, a pairing target).

Fifthly, the eNB 200 transmits a scan instruction for AP 300, to the UE 100 that is determined to be connected to the AP 300. In the present embodiment, the UE 100 is connected to the AP 300 when the scan is successful, and thus, it may be possible to consider that the scan instruction is an instruction to connect to the AP 300. The scan instruction includes an identifier (SSID/ESSID) for identifying the AP 300 being the connection target of the UE 100.

Figure 11:
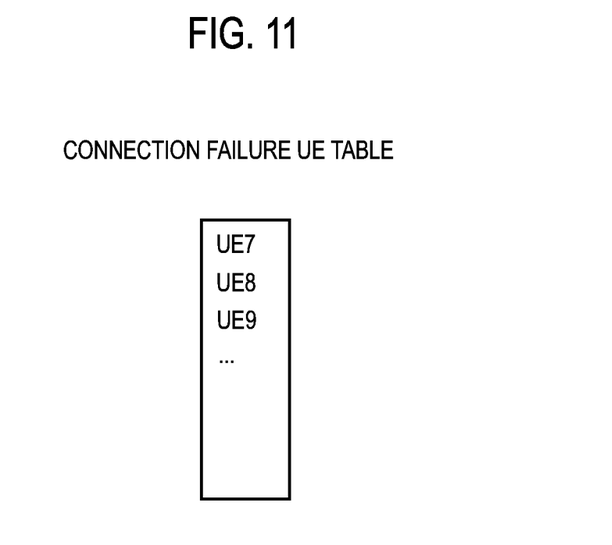
FIG. 11 is a diagram showing a specific example of a connection failure UE table according to the embodiment.

Then, the eNB 200 receives a report of a scan result from the UE 100, releases a radio resource for the UE 100 that has a successful scan (successful connection), and disconnects the connection. Further, the eNB 200 stores whether the scan is successful or not (whether the connection is successful or not). FIG. 11 shows a specific example of a table (connection failure UE table) where the UE 100 that has a failed connection to the AP 300 is recorded.

It is noted that from each of the above-described tables, information on the UE 100 that disconnects the connection to the eNB 200 is deleted, where appropriate. Further, the eNB 200 updates the pairing table so as to reflect an update of the WLAN non-support UE and an update of the connection failure UE table.

Figure 12:
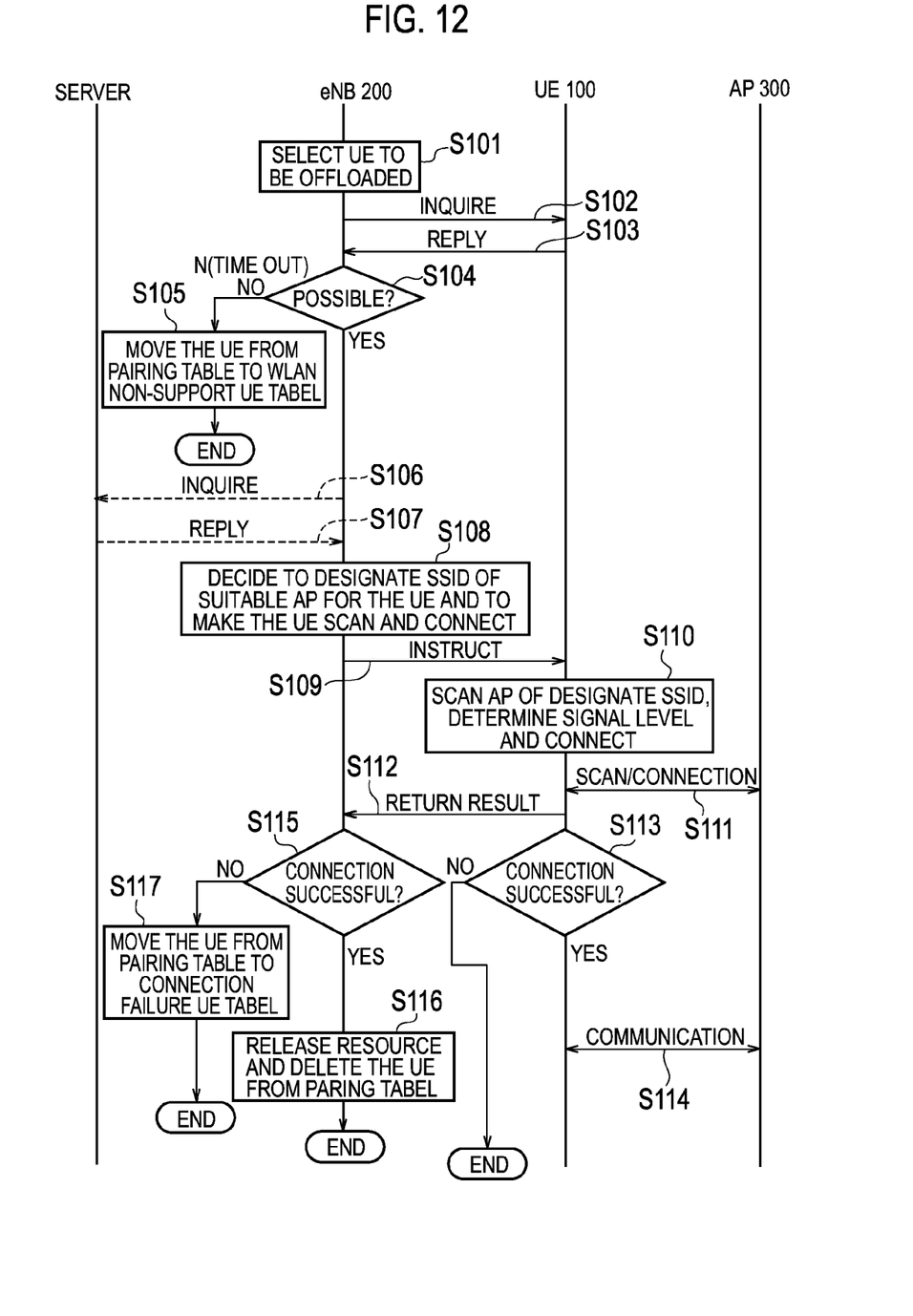
FIG. 12 is an operation sequence diagram according to the embodiment.

Next, a detailed example of an operation sequence according to the present embodiment will be described. FIG. 12 is an operation sequence diagram according to the present embodiment.

As shown in FIG. 12, in step S101, the eNB 200 selects the UE 100 to be connected to the AP 300, on the basis of the pairing table.

In step S102, the eNB 200 inquires the UE 100 selected on the basis of the pairing table, of the availability of the WLAN support.

In step S103, the UE 100 notifies the eNB 200 of the availability of the WLAN support, in response to the inquiry from the eNB 200.

When the UE 100 does not support the WLAN (step S104; No), in step S105, the eNB 200 registers the UE 100 into the WLAN non-support UE table.

On the other hand, when the UE 100 supports the WLAN (step S104; Yes), in steps S106 and S107, the eNB 200 inquires the service management server of whether or not the UE 100 can use the WLAN connection service and receives a reply. Such a process will be described in detail in a second modification of the embodiment. It is noted that the processes in steps S106 and S107 are not essential and thus may be omitted.

In step S108, on the basis of the pairing table, the eNB 200 decides to connect the UE 100 to the corresponding AP 300. Then, the eNB 200 acquires the identifier (SSID/ESSID) of the corresponding AP 300 from the AP registration information table.

In step S109, the eNB 200 transmits the scan instruction including the acquired AP identifier (SSID/ESSID), to the UE 100. It is noted that the scan instruction may include a plurality of AP identifiers (SSID/ESSID).

In steps S110 and S111, the UE 100 scans for the AP identifier (SSID/ESSID) included in the scan instruction received from the eNB 200. Specifically, it is determined whether or not to receive a beacon signal corresponding to the AP identifier (SSID/ESSID) included in the scan instruction. The UE 100 connects to the AP 300 that is discovered by the scan, when the scan is successful. The description below proceeds, with an assumption, where the scan is successful (that is, the designated AP 300 is discovered).

It is noted that the UE 100 may switch the WLAN transceiver 112 to an on state in accordance with the reception of the scan instruction, when the WLAN transceiver 112 is in an off state at the time when the scan instruction is received.

In step S112, the UE 100 notifies the eNB 200 of the result of the scan (that is, whether the connection to the AP 300 is successful or not).

The UE 100 starts WLAN communication with the AP 300 in step S114, when it is successful to connect to the AP 300 (step S113; Yes).

Further, when it is notified of the successful connection to the AP 300 (step S115; Yes), in step S116, the eNB 200 releases the radio resource assigned to the UE 100 and disconnects the connection to the UE 100. Moreover, the eNB 200 deletes the UE 100 from the pairing table.

On the other hand, when it is notified of the unsuccessful connection to the AP 300 (step S115; No), in step S117, the eNB 200 moves the UE 100 from the pairing table to the connection failure UE table.

(Conclusion of Embodiment)

As described above, in the present embodiment, the eNB 200 stores the location information of the AP 300. The eNB 200 acquires the location information of the UE 100 connected to the eNB 200, and on the basis of the respective location information of the AP 300 and the UE 100, determines whether or not the UE 100 is connected to the AP 300. Then, when it is determined that the UE 100 is connected to the AP 300, the eNB 200 transmits the scan instruction for the AP 300, to the UE 100. Thus, the UE 100 that is approaching the AP 300 is capable of discovering the AP 300. As a result, it is possible for the UE 100 to be connected to the AP 300, and thus, it is possible to efficiently use the AP 300 and disperse (offload) the load of the eNB 200 to the AP 300.

In the present embodiment, the UE 100 performs the scan on the AP 300 in response to the reception of the scan instruction from the eNB 200, and reports the result of the scan to the eNB 200. Further, the UE 100 connects to the AP 300 when the AP 300 is discovered by the scan. Thereby, the eNB 200 is capable of comprehending whether or not the UE 100 connects to the AP 300.

In the present embodiment, the eNB 200 determines whether or not the UE 100 is connected to the AP 300 on the basis further of the amount and/or the category of traffic transmitted and received by the UE 100. Thereby, it is possible to efficiently perform a load dispersion to the AP 300.

In the present embodiment, the eNB 200 inquires the UE 100 of whether or not the WLAN is supported. Thereby, it is possible for the eNB 200 to comprehend the UE 100 capable of load dispersion to the AP 300.

In the present embodiment, the scan instruction includes an identifier for identifying the AP 300. Thereby, the UE 100 is capable of efficiently discovering the AP 300 because it may suffice to scan only the AP 300 corresponding to the instructed identifier.

(First Modification of Embodiment)

In the above-described embodiments, secret communication between the UE 100 and the AP 300 has not been particularly considered; however, in the present modification, such secret communication is considered.

In the present modification, the eNB 200 inquires, the UE 100 determined to be connected to the AP 300, of whether there is connection setting information used in the secret communication with the AP 300. When such connection setting information is not provided in the user terminal, the eNB 200 requests the AP 300 of the connection target to issue temporary connection setting information. Then, the temporary connection setting information issued by the AP 300 in response to the request from the eNB 200 is notified to the UE 100 from the AP 300 via the eNB 200.

Detailed procedures will be described, below.

Firstly, the eNB 200 transmits, to the UE 100, WLAN connection setting confirmation information for inquiring whether there is a connection setting (secret setting) with the AP 300 of the connection target. The WLAN connection setting confirmation information includes an identifier (SSID/ESSID) of the AP 300 of the connection target.

Secondly, the UE 100 sends back, to the eNB 200, a WLAN connection setting response indicating whether there is the connection setting for the inquired AP 300. The WLAN connection setting response includes the identifier (SSID/ESSID) of the AP 300 of the connection target.

Thirdly, the eNB 200 transmits issuance request information requesting to issue a temporary connection setting, to the AP 300 of the connection target, when there is no connection setting in the WLAN connection setting response. The issuance request information includes MAC-ID of the WLAN of the UE 100.

Fourthly, the AP 300 generates the temporary connection setting information in response to the issuance request information from the eNB 200, and notifies the eNB 200 of the information. The temporary connection setting information includes information on the secret settings (a secret type and a secret key).

Fifthly, the eNB 200 adds the identifier (SSID/ESSID) of the AP 300 to the temporary connection setting information from the AP 300, and transfers the same to the UE 100. The eNB 200 may include the temporary connection setting information in the above-described scanning instruction.

(Second Modification of Embodiment)

In the above-described embodiments, whether the WLAN service is available to the UE 100 has not been particularly considered; however, in the present modification, whether the WLAN service is available to the UE 100 is considered.

In the present modification, the eNB 200 inquires a service management server of whether the UE 100 connecting to the cell of the eNB 200 is registered in a service allowing the use of the AP 300. The eNB 200 may transmit, from the eNB 200 to the UE 100, authentication information for registering in the service when the UE 100 is not registered in that service.

Detailed procedures will be described, below.

Firstly, the eNB 200 transmits, to the service management server, service registration confirmation information for inquiring whether there is the service registration in a WLAN network. The service registration confirmation information includes an identifier (such as MAC-ID) of the UE 100.

Secondly, the service management server sends back, to the eNB 200, service registration information indicating the registration in the WLAN service. The service registration information includes an identifier (such as MAC-ID) of the UE 100.

Thirdly, the eNB 200 transmits a scanning instruction (WLAN connection request) to the UE 100 when there is a service contract in the service registration information from the service management server. On the other hand, when there is no service contract, the eNB 200 does not transmit the scanning instruction to the UE 100. Alternately, the eNB 200 decides to provide a temporary service, and transmits, to the UE 100, authentication information for a temporary login setting for the service, that is, a service authentication key (an authentication ID and a password).

[Other Embodiments]

Thus, the present invention has been described with the embodiments. However, it should not be understood that those descriptions and drawings constituting apart of this disclosure limit the present invention. From this disclosure, a variety of alternate embodiments, examples, and applicable techniques will become apparent to one skilled in the art.

In the above-described embodiments, a case where the eNB 200 and the AP 300 are a separate device is described; however, the eNB 200 may include a function of the AP 300. That is, the eNB 200 may include a WLAN transceiver.

Further, in the above-described embodiments, as one example of the cellular communication system, the LTE system is described; however, the present invention is not limited to the LTE system, and the present invention may be applied to a cellular communication system other than the LTE system.

In addition, the entire content of U.S. Provisional Application No. 61/754,093 (filed on Jan. 18, 2013) is incorporated in the present specification by reference.

INDUSTRIAL APPLICABILITY

As described above, the communication control method, the base station and the user terminal according to the present invention are possible to effectively utilize a wireless LAN access point, and thus are useful for a mobile communication field.

The invention claimed is:

1. A communication control method for controlling a communication system, comprising:
   transmitting, by a base station, a plurality of identifiers of wireless LAN access points to a user terminal,
   notifying the base station, by the user terminal, of first information indicating a successful connection, in response to a successful connection to a predetermined wireless LAN access point indicated by an identifier included in the plurality of identifiers, and
   notifying the base station, by the user terminal, of second information indicating an unsuccessful connection, in response to an unsuccessful connection to all of the wireless LAN access points indicated by the plurality of identifiers.

2. A base station configured to perform cellular communication, comprising:
   a transmitter; and
   a receiver; wherein
   the transmitter is configured to transmit, to a user terminal configured to connect to the base station, a plurality of identifiers of wireless LAN access points, and
   the receiver is configured to:
      receive, from the user terminal, first information indicating a successful connection, in response to a successful connection of the user terminal to a predetermined wireless LAN access point indicated by an identifier included in the plurality of identifiers, and
      receive, from the user terminal, second information indicating an unsuccessful connection, in response to an unsuccessful connection of the user terminal to all of the wireless LAN access points indicated by the plurality of identifiers.

3. A user terminal configured to connect to a base station, which is configured to perform cellular communication, comprising:
   a receiver; and
   a transmitter; wherein
   the receiver is configured to receive a plurality of identifiers of wireless LAN access points from the base station, and
   the transmitter is configured to:
      notify the base station of first information indicating a successful connection, in response to a successful connection to a predetermined wireless LAN access point indicated by an identifier included in the plurality of identifiers; and
      notify the base station of second information indicating an unsuccessful connection, in response to an unsuccessful connection to all of the wireless LAN access points indicated by the plurality of identifiers.

* * * * *